(12) United States Patent
Li et al.

(10) Patent No.: US 8,433,576 B2
(45) Date of Patent: Apr. 30, 2013

(54) AUTOMATIC READING TUTORING WITH PARALLEL POLARIZED LANGUAGE MODELING

(75) Inventors: Xiaolong Li, Sammamish, WA (US); Yun-Cheng Ju, Bellevue, WA (US); Li Deng, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1435 days.

(21) Appl. No.: 11/655,702

(22) Filed: Jan. 19, 2007

(65) Prior Publication Data

US 2008/0177545 A1    Jul. 24, 2008

(51) Int. Cl.
*G10L 15/22* (2006.01)
(52) U.S. Cl.
USPC .................. 704/270; 704/251; 704/275
(58) Field of Classification Search .................. 704/270, 704/275, 251
See application file for complete search history.

(56) References Cited

U.S. PATENT DOCUMENTS

| 4,332,566 | A | | 6/1982 | Mazeski et al. | |
|---|---|---|---|---|---|
| 5,176,222 | A | | 1/1993 | Tippin | |
| 5,575,337 | A | | 11/1996 | Sapyta | |
| 5,636,697 | A | | 6/1997 | Pitchford | |
| 5,899,973 | A | | 5/1999 | Bandara et al. | 704/256.2 |
| 5,920,838 | A | * | 7/1999 | Mostow et al. | 704/255 |
| 6,017,219 | A | | 1/2000 | Adams, Jr. et al. | |
| 6,073,091 | A | * | 6/2000 | Kanevsky et al. | 704/9 |
| 6,134,529 | A | | 10/2000 | Rothenberg | 704/270 |
| 6,154,722 | A | | 11/2000 | Bellegarda | 704/257 |
| 6,176,319 | B1 | | 1/2001 | Ehrmann | |
| 6,224,383 | B1 | | 5/2001 | Shannon | 434/156 |
| 6,231,956 | B1 | | 5/2001 | Brenner et al. | |
| 6,266,642 | B1 | * | 7/2001 | Franz et al. | 704/277 |

(Continued)

FOREIGN PATENT DOCUMENTS

| JP | 11-52837 A | 2/1999 |
|---|---|---|
| KR | 10-2000-0037625 | 7/2000 |
| KR | 10-2001-0064247 | 7/2001 |
| KR | 10-2002-0076044 | 10/2002 |

OTHER PUBLICATIONS

Dusan et al. "Adaptive dialog based upon multimodal language acquisition", Proc. of IEEE international conference on multimodal interfaces, 2002.*

(Continued)

*Primary Examiner* — Jialong He
(74) *Attorney, Agent, or Firm* — Westman, Champlin & Kelly, P.A.

(57) ABSTRACT

A novel system for automatic reading tutoring provides effective error detection and reduced false alarms combined with low processing time burdens and response times short enough to maintain a natural, engaging flow of interaction. According to one illustrative embodiment, an automatic reading tutoring method includes displaying a text output and receiving an acoustic input. The acoustic input is modeled with a domain-specific target language model specific to the text output, and with a general-domain garbage language model, both of which may be efficiently constructed as context-free grammars. The domain-specific target language model may be built dynamically or "on-the-fly" based on the currently displayed text (e.g. the story to be read by the user), while the general-domain garbage language model is shared among all different text outputs. User-perceptible tutoring feedback is provided based on the target language model and the garbage language model.

20 Claims, 6 Drawing Sheets

U.S. PATENT DOCUMENTS

| | | | |
|---|---|---|---|
| 6,361,322 B1 | 3/2002 | Linden Henry et al. | |
| 6,468,084 B1 | 10/2002 | MacMillan | 434/185 |
| 6,865,528 B1* | 3/2005 | Huang et al. | 704/9 |
| 6,879,956 B1* | 4/2005 | Honda et al. | 704/244 |
| 6,901,364 B2* | 5/2005 | Nguyen et al. | 704/235 |
| 6,953,343 B2 | 10/2005 | Townshend | |
| 7,062,220 B2 | 6/2006 | Haynes et al. | |
| 7,243,071 B1 | 7/2007 | Resnick et al. | |
| 2002/0133340 A1* | 9/2002 | Basson et al. | 704/235 |
| 2004/0006461 A1 | 1/2004 | Gupta | |
| 2004/0049391 A1 | 3/2004 | Polanyi et al. | |
| 2004/0220809 A1* | 11/2004 | Wang et al. | 704/257 |
| 2004/0249628 A1 | 12/2004 | Chelba et al. | 704/4 |
| 2005/0080611 A1 | 4/2005 | Huang et al. | |
| 2005/0106540 A1 | 5/2005 | Wasowicz et al. | |
| 2005/0171761 A1 | 8/2005 | Ju et al. | 704/10 |
| 2005/0228667 A1 | 10/2005 | Duan et al. | 704/256 |
| 2005/0255431 A1 | 11/2005 | Baker | |
| 2005/0286743 A1 | 12/2005 | Kurzweil et al. | |
| 2006/0041428 A1* | 2/2006 | Fritsch et al. | 704/257 |
| 2006/0058996 A1* | 3/2006 | Barker | 704/231 |
| 2006/0058999 A1 | 3/2006 | Barker et al. | 704/256 |
| 2006/0063139 A1 | 3/2006 | Carver et al. | |
| 2006/0069561 A1* | 3/2006 | Beattie et al. | 704/251 |
| 2006/0069562 A1 | 3/2006 | Adams et al. | |
| 2007/0150278 A1* | 6/2007 | Bates et al. | 704/257 |

OTHER PUBLICATIONS

Balakrishna et al. "Automatic creation and tuning of context free grammars for interactive voice response systems", Procing of NLP, IEEE, Nov. 2005.*

Y.C. Tam, J. Mostow, J. Beck & S. Banerjee, "Training a Confidence Measure for a Reading Tutor that Listens", Sep. 1, 2003, Eurospeech 2003 pp. 3161-3164.

A. Hagen, B. Bellom, & R. Cole, "Children's Speech Recongnition with Application to Interactive Books and Tutors", Nov. 30, 2003, Proc. ASRU 2003 pp. 186-191.

A. Hagen, B. Bellom, S. Van Vuuren, & R. Cole, "Advances in Children's Speech Recognition within an Interactive Literacy Tutor", May 2, 2004, Proc. HLT-NAACL 2004 pp. 25-28.

D. Giuliani & M. Gerosa, "Investigating Recognition of Children's Speech", Apr. 6, 2003, Proc. ICASSP 2003 vol. 2, pp. 137-140.

S. Banerjee, J. Mostow, J. Beck & W. Tam, "Improving Language Models by Learning from Speech Recognition Errors in a Reading Tutor that Listens", Dec. 15, 2003, Proc. ICAAI 2003.

S. Narayanan & A. Potamianos, "Creating Conversational Interfaces for Children", Feb. 1, 2002, IEEE Transactions on Speech and Audio Processing 2002 vol. 10 pp. 65-78.

V. Zue, S. Seneff, J. Polinofri, H. Meng, & J. Glass, "Multilingual Human-Computer Interactions: From Information Access to Language Learning", Oct. 3, 1996, Proc. ICSLP 1996.

J. Mostow, S. Roth, A. Hauptmann, & M. Kane, "A Prototype Reading Coach that Listens", Jul. 31, 1994, Proc. AAAI 1994.

J. Mostow, "Is ASR Accurate Enough for Automated Reading Tutors, and How Can We Tell?", Sep. 17, 2006, Interspeech 2006—ICSLP.

S. Banerjee, J. Beck, & J. Mostow, "Evaluating the Effect of Predicting Oral Reading Miscues", Sep. 1, 2003, Proc. 8th Euro. Conference on Speech Communication and Technology.

D. Yu, Y.C. Ju, Y.Y. Wang, A. Acero, "N-Gram Based Filler Model for Robust Grammar Authoring", May 15, 2006, Proc. ICASSP 2006.

Y.C. Ju, Y.Y. Wang, A. Acero, "Call Analysis with Classification Using Speech and Non-Speech Features", May 15, 2006, Proc. ICASSP 2006.

K. Lee, A. Hagen, N. Romanyshyn, S. Martin, B. Pellom, "Analysis and Detection of Reading Miscues for Interactive Literacy Tutors", Aug. 23, 2004, Proc. COLING 2004.

G. Riccardi, R. Pieraccini, E. Bocchieri, "Sochastic Automata for Language Modeling", Oct. 1, 1996, Computer Speech and Language, vol. 10, pp. 265-293.

A. Hagen, B. Pellom, "A Multi-Layered Lexical-Tree Based Token Passing Architecture for Efficient Recognition of Subword Speech Units", Apr. 25, 2005, Proc. 2nd Language & Technology Conf. 2005.

J. Duchateau, M. Wigham, K. Demuynck, H. Van Hamme, "A Flexible Recognizer Architecture in a Reading Tutor for Children", May 20, 2006, SRIV 2006—ITRW on Speech Recognition and Intrinsic Variation.

International Search Report and Written Opinion of PCT/US2008/051582 filed on Jan. 21, 2008.

Russell, Martin, et al., "Applications of Automatic Speech Recognition to Speech and Language Development in Young Children" British Brown Copyright, 1996.

Cleuren, Leen, et al., "Developing an Automatic Assessment Tool for Children's Oral Reading", Katholieke Universiteit Leuven, Belgium. Published 2006.

Aist, Gregory, Skill-Specific Spoken Dialogs in a Reading Tutor that LISTEN, Project Listen, Pittsburg, PA, Published 1999.

PCT Application No. US2008/073570, International Search Report and Written Opinion dated Mar. 17, 2009.

U.S. Appl. No. 11/900,274 Prosecution History: Application and drawings filed Sep. 11, 2007; Feb. 22, 2011 Non-Final Office Action; May 11, 2011 Amendment. Total pp. 52.

Prosecution documents from U.S. Appl. No. 11/900,274: Final Office Action dated Jul. 5, 2011, Amendment with RCE filed Sep. 13, 2011, Notice of Allowance issued Sep. 6, 2012; 39 total pages.

* cited by examiner

AUTOMATIC READING TUTORING WITH PARALLEL POLARIZED LANGUAGE MODELING

BACKGROUND

Automatic reading tutoring has been a growing application for natural language processing and automatic speech recognition tools. An automatic reading tutoring system can provide a story or other text for a student to read out loud, and track the student's reading and any errors the student makes. It can diagnose particular kinds of systematic errors the student makes, respond to errors by providing assistance to the student, and evaluate d student's reading aptitude.

Automatic reading tutoring systems typically involve building a language model for a given story or other text prior to presenting the text to the student to begin a reading tutoring episode. Building the language model for the story or other text typically involves preparing to accommodate all possible words in the text being used, as well as all possible mistaken words the student might utter, to the best that these can be foreseen. This is particularly difficult for reading tutoring systems since one of their main audiences is children learning to read their native language, and children tend not only to make many unpredictable mistakes in reading, but also to get distracted and make frequent utterances that have nothing to do with the displayed text.

Building the language model for the text also typically involves accessing a large corpus and requires a significant amount of time to prepare. It also presents a large processing burden during runtime, which tends to translate into processing delays between when the student reads a line and when the computer is able to respond. Such delays tend to strain the student's patience and interrupt the student's attention. Additionally, the reading tutoring system cannot flag all possible reading errors, and may erroneously indicate the student has made an error when the student reads a portion of text correctly. Trying to improve the system's ability to catch errors and not indicate false alarms typically involves raising the time spent processing and further stretching out the delays in the system's responsiveness, while trying to reduce the system's lag time in responding conversely tends to degrade performance in error detection and false alarms.

The discussion above is merely provided for general background information and is not intended to be used as an aid in determining the scope of the claimed subject matter.

SUMMARY

A novel system for automatic reading tutoring is disclosed herein, that naturally provides effective error detection and reduced false alarms combined with low processing time burdens and response times short enough to maintain a natural, engaging flow of interaction. According to one illustrative embodiment, an automatic reading tutoring method includes displaying a text output and receiving an acoustic input. The acoustic input is modeled with a domain-specific target language model specific to the text output, and with a general-domain garbage language model. User-perceptible feedback is provided based on the target language model and the garbage language model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
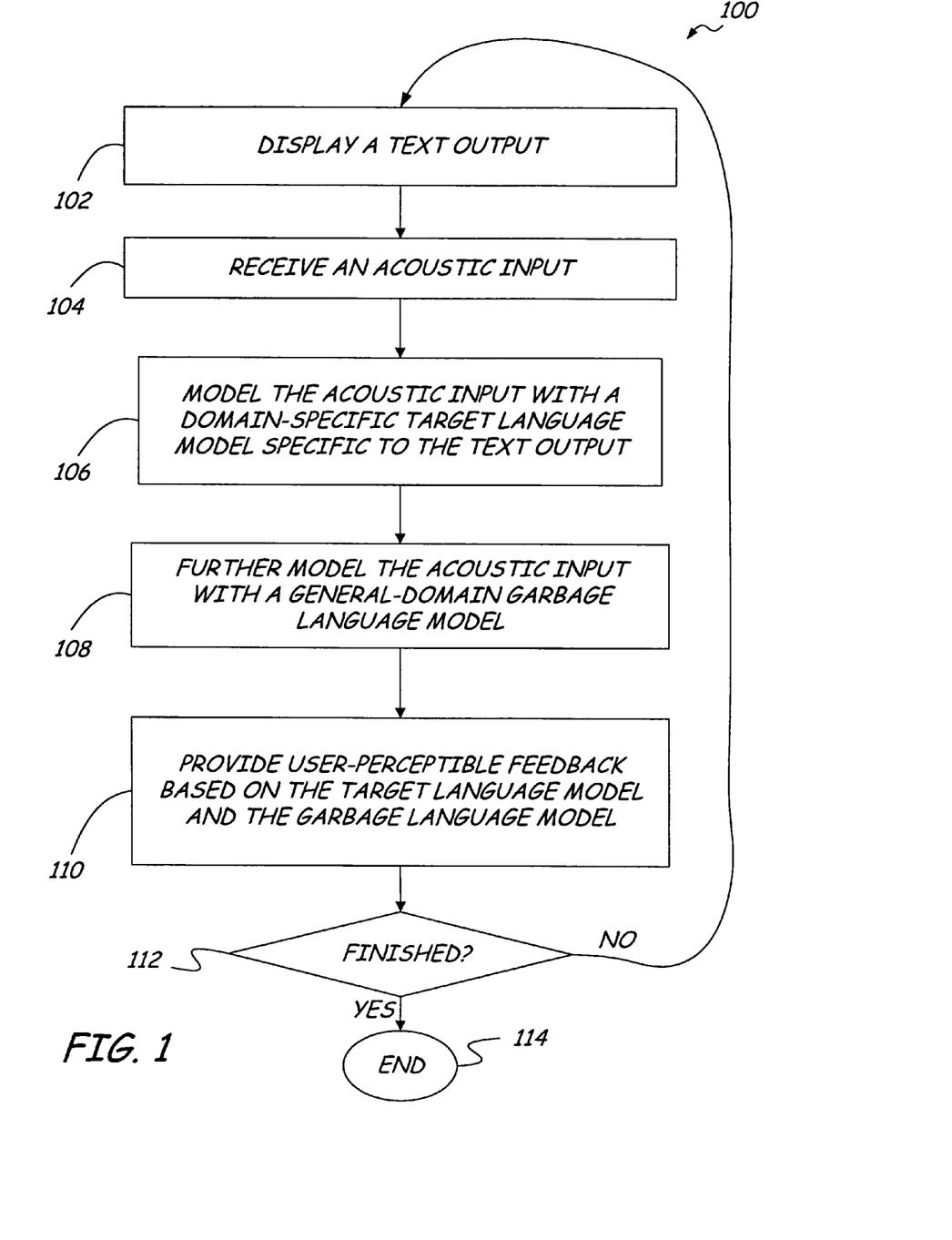
FIG. 1 depicts a flow diagram of a method for automatic reading tutoring, according to an illustrative embodiment.
Figure 2:
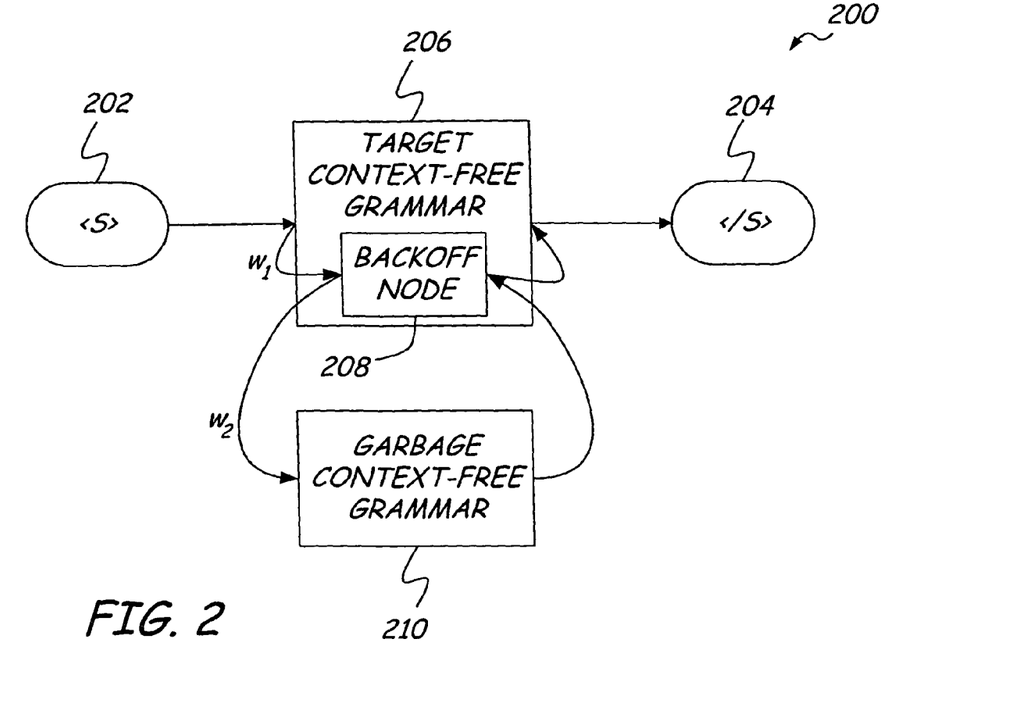
FIG. 2 depicts a block diagram of a language modeling system, according to an illustrative embodiment.
Figure 3:
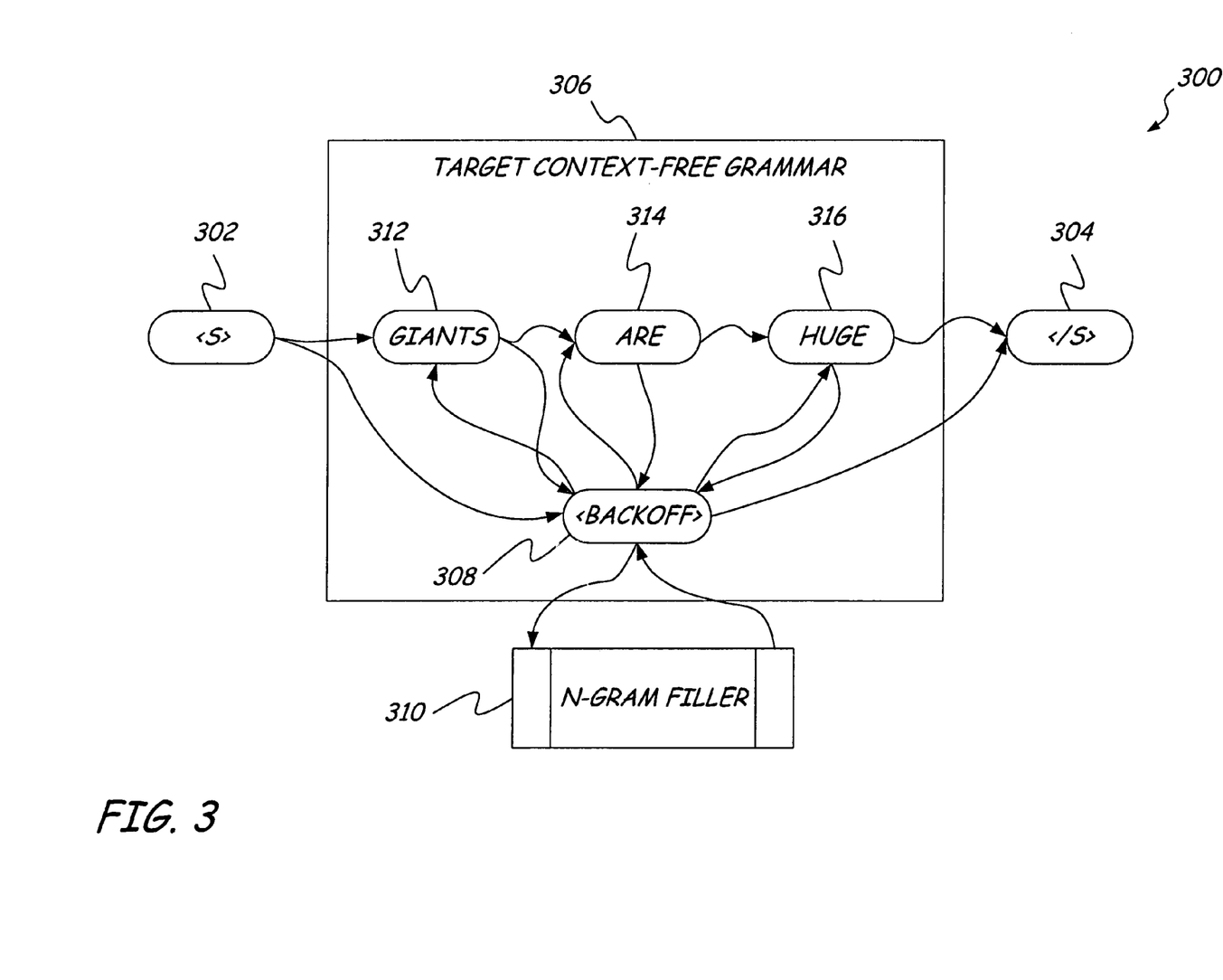
FIG. 3 depicts a block diagram of a language modeling system, according to an illustrative embodiment.
Figure 4:
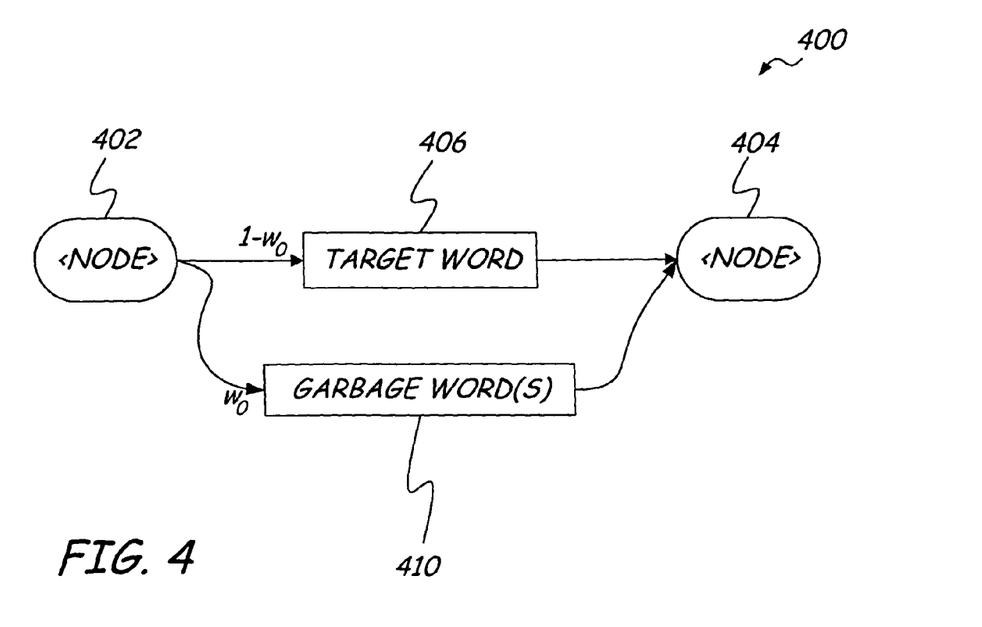
FIG. 4 depicts a block diagram of a language modeling system, according to an illustrative embodiment.

FIG. 1 depicts a flow diagram of an automatic reading tutoring method 100. Automatic reading tutoring method 100 may be implemented in any of a wide variety of software and computing implementations, as will be familiar to those skilled in the art, and which are surveyed below. FIGS. 2-4 depict block diagrams of automatic reading tutoring systems 200, 300, 400 according to various illustrative embodiments that may be associated with automatic reading tutoring method 100 of FIG. 1. Further details of various illustrative embodiments are provided below, which are illustrative and indicative of the broader meaning and variety associated with the disclosure and the claims provided herein.

Automatic reading tutoring method 100 includes step 102, of displaying a text output, such as a sentence of a paragraph from within a larger story or other text. Method 100 next includes step 104, of receiving an acoustic input, such as a spoken-word utterance from a student reading aloud the text output from step 102. Method 100 further includes step 106, of modeling the acoustic input with a domain-specific target language model specific to the text output; and step 108, of further modeling the acoustic input with a general-domain garbage language model.

The target language model and the garbage language model may be used, for example, to detect elements of the acoustic model that do not correspond properly to the text output, and to identify these elements as miscues. The target language modeling and garbage language modeling are done in parallel and used together, although in an asymmetrical fashion, since the target language model is domain-specific while the garbage language model is general-domain, providing unique advantages. Because the speech inputs are compared between the parallel target language model and garbage language model, and assigned to the one or the other, the language modeling can be thought of as polarizing the speech inputs. The steps 106, 108 of modeling the language models are further elaborated below.

Method 100 also includes step 110, of providing user-perceptible feedback based on the target language model and the garbage language model. Such user-perceptible feedback may provide confirmation and/or encouragement when the student reads the texts correctly, and may include information on any miscues, such as by providing suggestions or other assistance, when the student makes a mistake in reading the text. Such assistance may take the form of audible corrections to the miscues, provided by the computing device in spoken word, for example. These spoken-word corrections may be pre-recorded, or may be generated by a text-to-speech tool, for example. The assistance may also take the form of displaying a phonetic representation of the portion of the text output corresponding to a miscue, on a monitor or other visual output, for example. Such user-perceptible feedback thereby provides automatic reading tutoring for the student.

The user-perceptible feedback may also take the form of an evaluation of how well the acoustic input corresponds to the text output, such as a score representing how much of the acoustic input is free of miscues. Such an evaluation can constitute a score on which the student is graded for a test, or it can be used by the student or the student's teacher or parent to keep track of the student's progress over time and set goals for further learning.

In an application in which the reading tutoring system is provided for students of a second language, as opposed to children learning to read their native language, the user-perceptible feedback may include displaying a translation into a different language, such as the student's native language, of a portion of the text output for which the acoustic input includes a miscue.

Such user-perceptible feedback may also be provided when the system evaluates the acoustic input to correctly correspond to the text output, indicating that the student has correctly read the text output. ("The system" here, and throughout the remaining disclosure, may be used as a shorthand reference to a computing system executing an illustrative embodiment, such as method 100.) For example, the system may provide a low-key, unobtrusive running indicator of each of the student's spoken-word inputs that represents a correct reading of the corresponding text output. This might be, for example, a green light that lights up in a corner of a screen every time the student correctly reads a text output, in one illustrative embodiment.

Method 100 further includes decision node 112, in which the system evaluates whether it is finished with a larger reading tutoring episode of which the text output of step 102 is part.

If the system is finished with a reading tutoring episode, the method may proceed to endpoint 114. If it is not yet finished, the system may return to the beginning and iteratively repeat the process of displaying additional text outputs as in step 102, receiving corresponding acoustic inputs as in step 104, assembling additional domain-specific target language models respectively based on each of the additional text outputs as in step 106, modeling the acoustic input with the general-domain garbage language model as in step 108, and provide new user-perceptible feedback for that iteration, as in step 110.

Step 106, of modeling the acoustic input with a domain-specific target language model specific to the text input, may be performed within a restricted period of time relative to when its respective text output is displayed as in step 102. That is, the system may calculate a language model score for the target words of the displayed text only once the target words are called up for display, which may be in a sentence or a paragraph at a time, for example. In this illustrative embodiment, therefore, a small language model is built just for an individual sentence or paragraph at the time that short text sample is brought up for display, for the student to read.

This provides a number of advantages. Because the text sample is so small, the system can process it in a very short time, short enough that the student will not experience any noticeable delay. This also allows the system to begin functioning, or to begin a tutoring episode based on a text or a position within a text just selected by the student, without having to then stop and process the entire text prior to allowing the student to continue.

A reading tutoring system such as this is illustratively depicted as language modeling system 200 in FIG. 2. Language modeling system 200 involves a combination of general-domain garbage modeling and domain-specific target modeling, implemented in this illustrative embodiment with target language model 206, a domain-specific statistical language model implemented as a Context-Free Grammar (CFG), in this embodiment; and garbage language model 210, a general-domain N-gram statistical language model implemented as a Context-Free Grammar (CFG), in this embodiment. Target language model 206 is engaged through grammar entry node 202, and leads to grammar exit node 204, in this illustrative embodiment.

Ordinarily, a general-domain N-gram statistical language model has a low processing burden but poor modeling performance, while a domain-specific statistical language model ordinarily has high modeling performance but imposes a high processing burden involving significant delays.

Language modeling system 200 combines the best of both worlds, as an on-line interpolated language model, with the domain-specific target language model 206 at its core, which is trained on-the-fly from a limited set of training sentences, such as a then-current sentence or paragraph in a story or other text output. At the same time, the general-domain garbage language model 210, which may be implemented as an N-Gram Filler, such as a restricted version of a dictation grammar, is attached to target language model 206 through a unigram back-off node 208 comprised in target language model 206. Garbage language model 210 thereby provides robustness in that it is able to siphon off general miscues without having to have them defined in advance. The interpolation between target language model 206 and garbage language model 210 may be promoted by reserving some unigram counts for unforeseen garbage words, to get swept aside from target language model 206 by garbage language model 210.

Beginning from the path from grammar entry node 202 to target language model 206, target language model 206 then has a weight $w_1$ that controls the possibility of moving from within target language model 206 to unigram back-off node 208. A second weight, $w_2$, controls the possibility of moving from unigram back-off node 208 to garbage language model 210. The target language model 206 is relatively small, such as enough to occupy a few kilobytes of memory in one embodiment, due to being based on only the text sample currently on display at a given time, such as a paragraph or a sentence. The garbage language model 210 is significantly larger—in the same embodiment, it may be enough to occupy several megabytes of memory—but this does not pose any significant processing burden or reaction time delay, because the one single garbage language model 210 may be shared for the purposes of all the text samples that are successively modeled with the target language model 206. So, the only new language model that is built within the timeframe of providing the display text output, is the few kilobytes worth or so of the local-scale, on-the-fly target language model 206.

FIG. 3 elaborates on the embodiment of FIG. 2. FIG. 3 depicts language modeling system 300, according to an illustrative embodiment which shares a number of common or analogous features with the illustrative embodiment of FIG. 2. FIG. 3 includes grammar entry node 302, grammar exit node 304, target language model 306, unigram back-off node 308 comprised in target language model 306, and garbage language model 310, implemented as an N-Gram Filler. Target language model 306 in this embodiment is built from a text output comprising a single sentence from a story. The sentence reads simply, "Giants are huge". Target language model 306 includes a binary Context Free Grammar built from this single sentence.

In addition to the special nodes consisting of the grammar entry node 302, grammar exit node 304, and unigram back-off node 308, target language model 306 includes three nodes corresponding to bigram states with one word each: bigram state node 312 for the word "Giants", bigram state node 314 for the word "are", and bigram state node 316 for the word "huge". Running between the nodes are possible paths that may be taken, depending on the acoustic input. Each of grammar entry node 302 and bigram state nodes 312, 314, and 316 have possible paths leading to unigram back-off node 308, and thence to garbage language model 310 and back, if any one of the nodes is followed by a miscue. Target language model 306 may also include more complex N-gram nodes to provide stronger robustness, such as trigram nodes "<s> Giants", "Giants Are", "Are Huge", "Huge </s>" (not shown in FIG. 3), in the example sentence "Giants are huge". The domain-specific target language model may therefore be constructed with different complexity ranging from simple unigrams, to more complex bigrams and trigrams, to more complicated higher-order N-grams, in order to provide different levels of robustness in the system. Using a relatively simpler unigram or bigram garbage language model may provide significant advantages in efficiency. The complexity of the domain-specific target language model may be user-selectable, and may be selected according to the nature of the applications being implemented and the user's reading ability.

Grammar entry node 302, bigram state nodes 312, 314, and 316, and grammar exit node 304 also have possible paths running in sequence between them, allowing for the potential match of the acoustic input with bigrams composed of the bigram state nodes 312, 314, if the student correctly reads aloud (as embodied in the acoustic input) the two-word sequence "Giants are", as well as the potential match of the acoustic input with bigrams composed of the bigram state nodes 314, 316, if the student correctly reads aloud the two-word sequence "are huge".

The garbage language model 310 is used to detect reading miscues, whether or not unforeseen, and without any need to predict in advance what the miscues will be like, to assemble and comb through a miscue database, or to try to decode miscues phonetically. This provides a particular advantage in a reading tutoring system for children, who are liable to say any variety of things or make any variety of sounds that have nothing to do with the displayed text output they are supposed to be reading. It is also advantageous for adult learners of a second language, as it detects the frequent miscues they may make such as by mispronouncing the words in the text output of the non-native language they are studying.

Garbage language model 310 may be obtained from a general-domain N-gram model, but restricted or trimmed down to a smaller selection from a dictation grammar, such as only the 1,600 most common words, for example. This is one example of a small selection that will reduce the processing burden on the system, that is nevertheless very effective. A small set of lexical features may be used by the garbage language model 310, to save further on the processing burden. It has been found, for example, that basing the garbage language model 310 only on unigrams and bigrams provided very effective garbage language modeling, that was not substantially improved by trying to add additional, more burdensome lexical features to the language modeling. Garbage language model 310 with different complexity may be used, ranging from a simple unigram to more a more complex bigram or trigram, or higher order N-gram, although in some embodiments, higher orders of N-grams may provide diminishing returns in robustness while increasing the computational burden, such that building the garbage language model in a unigram or bigram form may provide the best efficiency for the goals for that embodiment.

Figure 5:
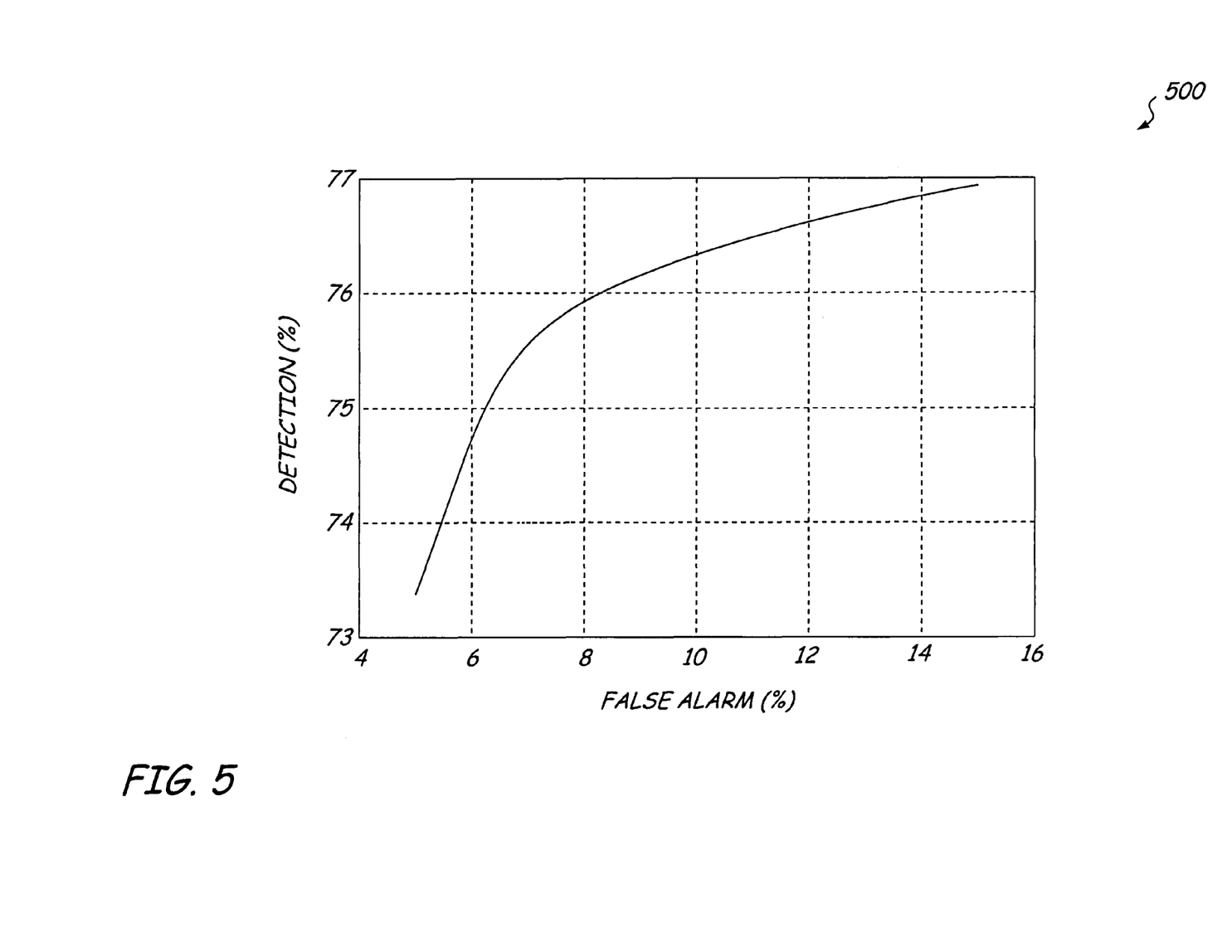
FIG. 5 depicts a graph illustrating a feature of an automatic reading tutoring system, according to an illustrative embodiment.

Garbage language model 310 can thereby be built on-the-fly, during usage of the reading tutoring system; garbage language model 310 does not impose any burden to change decoding engines, and it can interface with any automatic speech recognition system; and it provides adjustable, tunable weighting parameters $w_1$, $w_2$ that allow the sensitivity of the garbage language modeling, in terms of its Receiver Operating Characteristic (ROC) curve, to be freely adjusted, based on preference, the level of the student's knowledge, and so forth. FIG. 5 depicts just such an ROC curve for garbage language model 310, based on further discussion on the weighting parameters provided below in connection with FIG. 4.

FIG. 4 depicts a language modeling system 400 with analogous elements to those discussed above, although this one is directed to an equivalent two-path grammar for a single word. Language modeling system 400 includes grammar entry node 402, grammar exit node 404, target word node 406, and garbage word node 410. Language modeling system 400 also includes tunable weighting parameter $w_0$, that applies to the path leading to garbage word node 410. The weighting parameter $w_0$ can be calculated based on the weighting parameters $w_1$, $w_2$ and the target language model 206 in FIG. 2. Garbage word node 410 is not limited to modeling words per se, but may also output garbage words that are acoustically similar to subword-level miscues that are detected, such as a partial word, a hesitation or elongation, or background noise, for example.

Given a spoken word acoustic input X, a target word T, and a garbage word G, a hypothesis testing scenario can be obtained as follows:

$H_0$: Target word T exists;
$H_1$: Target word T does not exist;
Then the decision rule is given by:

$$H_0: \text{ when } \frac{P(H_0|X)}{P(H_1|X)} = \frac{(1-w_0)P(X|T)P(T)}{w_0 P(X|G)P(G)} \succ 1$$

$H_1$: otherwise;
where $P(X|T)$ and $P(X|G)$ are the acoustic score for the target and garbage words, respectively, and $P(T)$ and $P(G)$ are language model scores for the target and garbage words, respectively. The above decision rule is equivalent to the following decision rule:

$$H_0: \text{ when } \frac{P(X|T)P(T)}{P(X|G)P(G)} \succ \lambda = \frac{w_0}{1-w_0}$$

$H_1$: otherwise;
where $\lambda$ is a threshold as an explicit function of the weighting parameter $w_0$. This detection scenario is equivalent to regular hypothesis testing in an utterance verification problem.

When the garbage model weight is increased, therefore, the miscue detection rate also increases, along with some increase in the rate of false alarms. The relationship between the prevalence of the two factors according to one illustrative implementation can be seen in FIG. 5, where the curve represents the rates of both detection and false alarm corresponding to a series of selected weighting parameters $w_0$ with a set of pre-trained acoustic model and language models. In general, it may often be desirable to train better acoustic and language models to obtain a curve towards the upper left corner of the graph, to work a good compromise between relatively high detection and relatively low false alarm rate.

For a fixed set of acoustic and language models, it may also be desired to adjust the weighting parameter to be more lenient, and occupy a spot on the curve more toward the lower left, such as for beginning students. This is to specifically avoid false alarms that might discourage these beginning students, at the expense of performance in the absolute detection rate. For more advanced students such as adult learners of a second language, and still assuming a fixed set of acoustic and language models, it may be preferable to adjust the weighting parameter $w_0$ to make the system more strict, i.e. to move the operating point toward the upper right portion of the curve in FIG. 5, when the students might be expected to understand the false alarms as such or to have more patience with them, but be more interested in addressing as many errors in reading as possible.

The miscues may be identified with one or more miscue categories, and the user-perceptible feedback may be based in part on one of the miscue categories with which a miscue in the acoustic input is identified, so that it will correct a mispronunciation, for example, but simply continue to prompt for an acoustic input if the miscue is an interjection or background noise. The miscue categories may include, for example, word repetition, breath, partial word, pause, hesitation or elongation, wrong word, mispronunciation, background noise, interjection or insertion, non-speech sound, and hyperarticulation.

Figure 6:
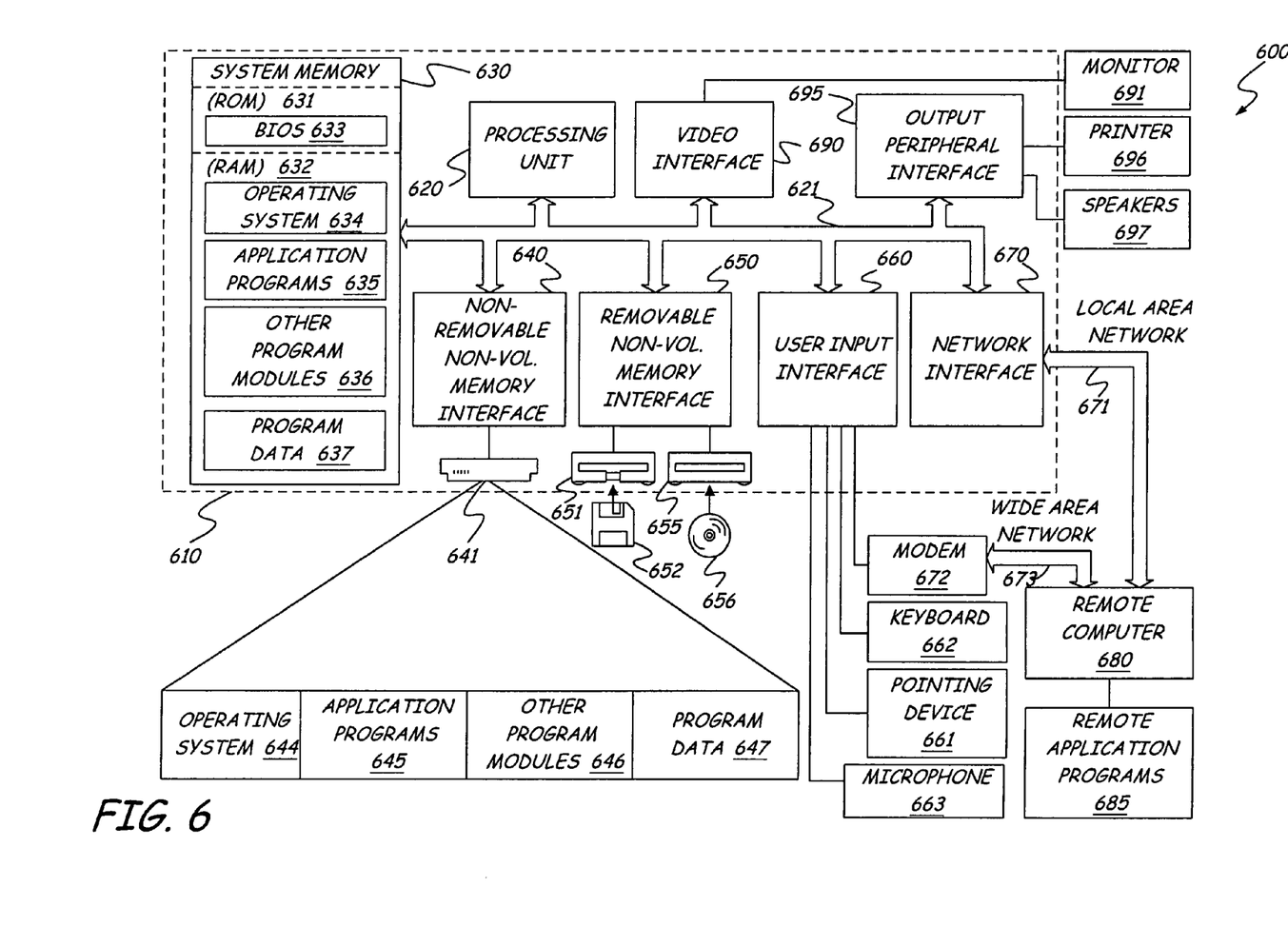
FIG. 6 depicts a block diagram of one computing environment in which some embodiments may be practiced, according to an illustrative embodiment.

FIG. 6 illustrates an example of a suitable computing system environment 600 on which various embodiments may be implemented. For example, various embodiments may be implemented as software applications, modules, or other forms of instructions that are executable by computing system environment 600 and that configure computing system environment 600 to perform various tasks or methods involved in different embodiments. A software application or module associated with an illustrative implementation of an automatic reading tutoring system with parallel polarized language modeling may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

Computing system environment 600 as depicted in FIG. 6 is only one example of a suitable computing environment for implementing various embodiments, and is not intended to suggest any limitation as to the scope of use or functionality of the claimed subject matter. Neither should the computing environment 600 be interpreted as having any dependency or requirement relating to any one or combination of components illustrated in the exemplary operating environment 600.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 6, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example and not limitation, FIG. 6 illustrates operating system 634, application programs 635, other program modules 636, and program data 637.

The computer 610 may also include other removable/non-removable volatile/nonvolatile computer storage media. By way of example and not of limitation, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they may be different copies.

A user may enter commands and information into the computer 610 through input devices such as a keyboard 662, a microphone 663, and a pointing device 661, such as a mouse, trackball or touch pad. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on remote computer 680. It will be appreciated that the network connections shown are exemplary and other means of establishing a communications link between the computers may be used.

Figure 7:
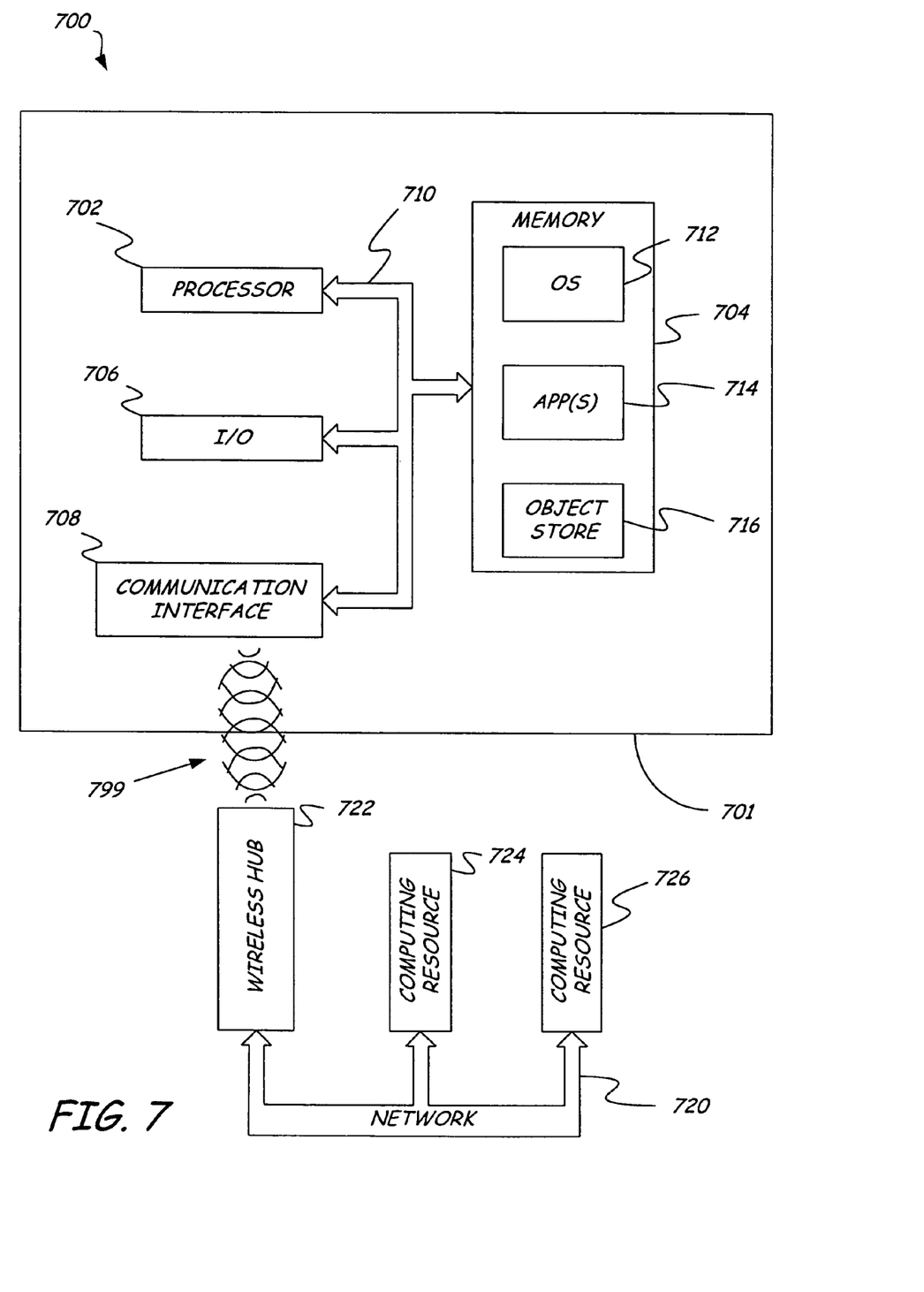
FIG. 7 depicts a block diagram of a mobile computing environment in which some embodiments may be practiced, according to an illustrative embodiment.

FIG. 7 depicts a block diagram of a general mobile computing environment 700, comprising a mobile computing device 701 and a medium, readable by the mobile computing device and comprising executable instructions that are executable by the mobile computing device, according to another illustrative embodiment. FIG. 7 depicts a block diagram of a mobile computing system 700 including mobile device 701, according to an illustrative embodiment. Mobile device 701 includes a microprocessor 702, memory 704, input/output (I/O) components 706, and a communication interface 708 for communicating with remote computers or other mobile devices. In one embodiment, the afore-mentioned components are coupled for communication with one another over a suitable bus 710.

Memory 704 is implemented as non-volatile electronic memory such as random access memory (RAM) with a battery back-up module (not shown) such that information stored in memory 704 is not lost when the general power to mobile computing device 701 is shut down. A portion of memory 704 is illustratively allocated as addressable memory for program execution, while another portion of memory 704 is illustratively used for storage, such as to simulate storage on a disk drive.

Memory 704 includes an operating system 712, application programs 714 as well as an object store 716. During operation, operating system 712 is illustratively executed by processor 702 from memory 704. Operating system 712, in one illustrative embodiment, is a WINDOWS® CE brand operating system commercially available from Microsoft Corporation. Operating system 712 is illustratively designed for mobile devices, and implements database features that can be utilized by applications 714 through a set of exposed application programming interfaces and methods. The objects in object store 716 are maintained by applications 714 and operating system 712, at least partially in response to calls to the exposed application programming interfaces and methods.

Communication interface 708 represents numerous devices and technologies that allow mobile computing device 701 to send and receive information. The devices include wired and wireless modems, satellite receivers and broadcast tuners to name a few. Mobile computing device 701 can also be directly connected to a computer to exchange data therewith. In such cases, communication interface 708 can be an infrared transceiver or a serial or parallel communication connection, all of which are capable of transmitting streaming information.

Input/output components 706 include a variety of input devices such as a touch-sensitive screen, buttons, rollers, and a microphone as well as a variety of output devices including an audio generator, a vibrating device, and a display. The devices listed above are by way of example and need not all be present on mobile computing device 701. In addition, other input/output devices may be attached to or found with mobile computing device 701.

Mobile computing environment 700 also includes network 720. Mobile computing device 701 is illustratively in wireless communication with network 720—which may be the Internet, a wide area network, or a local area network, for example—by sending and receiving electromagnetic signals 799 of a suitable protocol between communication interface 708 and wireless interface 722. Wireless interface 722 may be a wireless hub or cellular antenna, for example, or any other signal interface. Wireless interface 722 in turn provides access via network 720 to a wide array of additional computing resources, illustratively represented by computing resources 724 and 726. Naturally, any number of computing devices in any locations may be in communicative connection with network 720. Mobile computing device 701 is enabled to make use of executable instructions stored on the media of memory component 704, such as executable instructions that enable mobile computing device 701 to implement various functions of automatic reading tutoring with parallel polarized language modeling, in an illustrative embodiment.

Although the subject matter has been described in language specific to certain illustrative structural features and/or methodological acts, it is to be understood that the subject matter defined in the appended claims is not limited to the specific features or acts described above. Rather, the specific features and acts described above are disclosed as illustrative examples of ways in which the claims may be implemented. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances in accordance with the developing understanding of those skilled in the art, while still remaining consistent with and encompassed by the subject matter defined by the claims herein.

What is claimed is:

1. A computer-implemented method comprising:
   providing a user option to tune a weighting parameter, and responding to tuning of the weighting parameter by raising or lowering criteria for a general-domain garbage language model to adjust a miscue detection rate and a rate of false alarms;
   displaying a text output having target words;
   dynamically generating a domain-specific target language model for the text output, the target language model being specific to the text output having the target words and including a language score for the target words of the text output;
   receiving an acoustic input;
   modeling, using a processor of a computer, the acoustic input with the dynamically generated domain-specific target language model, comprising calculating an acoustic score for the target words with reference to the acoustic input;
   further modeling the acoustic input with the general-domain garbage language model to identify an element of the acoustic input as a miscue that does not correspond properly to the target words of the text output; and
   providing user-perceptible feedback.

2. The method of claim 1, wherein the target language model is constructed with N-grams of a user-selectable order.

3. The method of claim 2, wherein the N-grams are selected from one or more of unigrams, bigrams, and trigrams.

4. The method of claim 1, wherein the user-perceptible feedback comprises an audible correction to the miscue.

5. The method of claim 1, wherein the user-perceptible feedback comprises displaying a translation into a different language of a portion of the text output for which the acoustic input includes the miscue.

6. The method of claim 1, wherein the miscue is identified with one or more miscue categories and the user-perceptible feedback is based in part on one of the miscue categories with which the miscue in the acoustic input is identified, wherein the miscue categories comprise one or more of: word repetition, breath, partial word, pause, hesitation or elongation, wrong word, mispronunciation, background noise, interjection or insertion, non-speech sound, and hyperarticulation.

7. The method of claim 1, further comprising applying a weighting parameter to the criteria for the garbage language model, and applying one minus the weighting parameter to the criteria for the target language model.

8. The method of claim 1, wherein the garbage language model is assembled based on a restricted selection of relatively common words from a dictation grammar.

9. The method of claim 1, wherein the target language model and the garbage language model are constructed as context-free grammars.

10. The method of claim 1, wherein the garbage language model comprises an N-gram filler that is constructed as a context-free grammar.

11. The method of claim 1, wherein providing user-perceptible feedback comprises at least one of:
    displaying a phonetic representation of a portion of the text output corresponding to the miscue, the phonetic representation being displayed in addition to the portion of the text output corresponding to the miscue; and
    displaying a score representing how much of the acoustic input is free of miscues.

12. A computer-implemented method comprising:
    receiving a user input indicative of a user-selected order of N-grams;
    accessing a text sample;
    identifying a first portion of the text sample, the first portion comprising at least a first phrase of the text sample;
    displaying the first portion of the text sample to the user and dynamically assembling a domain-specific target language model for the first portion of the text sample while the first portion of the text sample is being displayed to the user, wherein assembling the domain-specific target language model comprises:

selecting an order of N-grams based on the user input; and constructing the domain-specific target language model based on the selected order of N-grams;

receiving an acoustic input from the user;

modeling the acoustic input, using a processor of a computer, with the domain-specific target language model and a general-domain garbage language model to identify elements of the acoustic input as miscues that do not correspond properly to the first portion of the text output; and providing user-perceptible feedback based on modeling the acoustic input with the target language model and modeling the acoustic input with the garbage language model.

13. The method of claim 12, further comprising:

iteratively displaying additional portions of the text sample to the user, and dynamically assembling additional domain-specific target language models respectively based on each of the additional portions of the text sample while they are being displayed.

14. The method of claim 13, and further comprising:

for each of the iteratively displayed additional portions of the text sample, receiving an additional acoustic input from the user for the respective additional portion of the text sample, modeling the additional acoustic input with the additional domain-specific target language model dynamically assembled based on the respective additional portion of the text sample, and providing user-perceptible feedback for the additional acoustic input based on the additional domain-specific target language model and the garbage language model.

15. The method of claim 13, wherein providing user-perceptible feedback comprises at least one of:

displaying a phonetic representation of a portion of the text output corresponding to a miscue, the phonetic representation being displayed separate from the portion of the text output corresponding to the miscue; and displaying a score representing how much of the acoustic input is free of miscues.

16. The method of claim 13, wherein the user-perceptible feedback comprises displaying a translation into a different language of a portion of the text output for which the acoustic input includes the miscue.

17. The method of claim 13, wherein a miscue is identified with one or more miscue categories and the user-perceptible feedback is based in part on one of the miscue categories with which the miscue in the acoustic input is identified, wherein the miscue categories comprise one or more of: word repetition, breath, partial word, pause, hesitation or elongation, wrong word, mispronunciation, background noise, interjection or insertion, non-speech sound, and hyperarticulation.

18. A computer-implemented method comprising:

retrieving an indication of a text having target words from a data store;

calculating a language model score for the target words using a domain-specific target model that is specific to the text having the target words;

receiving an acoustic signal via a user input;

calculating an acoustic score for the target words with reference to the acoustic signal using the domain-specific target model;

obtaining a general-domain garbage model indicative of a set of garbage words including common words in a general domain;

obtaining an acoustic score and a language model score for the set of garbage words from the general-domain garbage model;

evaluating whether the acoustic signal comprises a mispronunciation with reference to the target words of the text based on a weighted comparison of the acoustic score and the language model score for the target words with the acoustic score and the language model score for the set of garbage words;

providing user-perceptible feedback based on the evaluation; and providing a user option to tune a weighting parameter, and responding to tuning of the weighting parameter by raising or lowering criteria for the garbage model to adjust a miscue detection rate and a rate of false alarms.

19. The computer-implemented method of claim 18, and further comprising retrieving a plurality of textual units each having a plurality of target words.

20. The computer-implemented method of claim 19, and further comprising:

iteratively displaying the plurality of textual units to a user, and dynamically assembling additional domain-specific target language models respectively based on each of the additional portions of the text sample while they are being displayed.

* * * * *